US009008726B2

(12) United States Patent
Aminaka et al.

(10) Patent No.: US 9,008,726 B2
(45) Date of Patent: Apr. 14, 2015

(54) BASE STATION APPARATUS, MOBILE STATION APPARATUS, COMMUNICATION SYSTEM, BASE STATION APPARATUS CONTROL METHOD, MOBILE STATION APPARATUS CONTROL METHOD, AND RECORDING MEDIUM STORING PROGRAM

(75) Inventors: Hiroaki Aminaka, Toyko (JP); Vivek Sharma, Surrey (GB)

(73) Assignee: NEC Corporation, Tokyo (JP)

(*) Notice: Subject to any disclaimer, the term of this patent is extended or adjusted under 35 U.S.C. 154(b) by 931 days.

(21) Appl. No.: 13/143,684

(22) PCT Filed: Dec. 21, 2009

(86) PCT No.: PCT/JP2009/007061
§ 371 (c)(1),
(2), (4) Date: Jul. 7, 2011

(87) PCT Pub. No.: WO2010/079560
PCT Pub. Date: Jul. 15, 2010

(65) Prior Publication Data
US 2011/0269406 A1 Nov. 3, 2011

(30) Foreign Application Priority Data
Jan. 9, 2009 (JP) ................................. 2009-003505

(51) Int. Cl.
*H04M 1/00* (2006.01)
*H04B 1/38* (2006.01)
(Continued)

(52) U.S. Cl.
CPC ............. *H04W 24/10* (2013.01); *H04W 88/08* (2013.01)

(58) Field of Classification Search
USPC .................. 455/418, 420, 63.1, 67.11, 67.13, 455/67.15, 68, 69, 561, 522, 423–425
See application file for complete search history.

(56) References Cited

U.S. PATENT DOCUMENTS 6,405,047 B1 * 6/2002 Moon ......................... 455/456.1
6,608,823 B1 * 8/2003 Kito ............................. 370/331
(Continued)

FOREIGN PATENT DOCUMENTS

CN 1973567 A 5/2007
CN 101111055 A 1/2008
(Continued)

OTHER PUBLICATIONS

Office Action dated Jun. 27, 2013 issued by the State Intellectual Property Office of the People's Republic of China in counterpart Chinese Patent Application No. 200980153689.9.
Korean Office Action, Dated Aug. 30, 2012, Issued by the Korean Intellectual Property Office in Counterpart Application No. 2005-01000951.
3GPP TS 25.467 V1.0.0, "3rd Generation Partnership Project; Technical Specification Group Radio Access Network; UTRAN architecture for 3G House NodeB; Section 2 (Release 8)," Dec. 2008, pp. 1-22.
(Continued)

*Primary Examiner* — Tuan A Tran
(74) *Attorney, Agent, or Firm* — Sughrue Mion, PLLC

(57) ABSTRACT

To enable a mobile station, when a base station carries out a measurement of a radio signal coming from an adjacent cell while suspending at least one of radio transmission to and radio reception from the mobile station when a base station's own cell is in operation, to recognize that the adjacent cell is being measured. A home base station 1 carries out a measurement of a radio signal coming from an adjacent cell while suspending at least one of radio transmission to and radio reception from a mobile station 3-1 when a base station's own cell (home cell) is in operation. Further, the home base station 1 notifies, prior to beginning the measurement, advance notice information indicating an execution of the measurement to the mobile station 3-1.

27 Claims, 10 Drawing Sheets

(51) Int. Cl.
  *H04W 24/10* (2009.01)
  *H04W 88/08* (2009.01)

(56) References Cited

U.S. PATENT DOCUMENTS

| | | | |
|---|---|---|---|
| 7,069,009 B2* | 6/2006 | Li et al. | 455/446 |
| 8,259,601 B2* | 9/2012 | Fu | 370/252 |
| 8,351,949 B2* | 1/2013 | Fu | 455/450 |
| 8,630,674 B2* | 1/2014 | Rosay et al. | 455/522 |
| 2004/0127223 A1* | 7/2004 | Li et al. | 455/446 |
| 2007/0253372 A1* | 11/2007 | Nakayasu | 370/331 |

FOREIGN PATENT DOCUMENTS

| | | |
|---|---|---|
| CN | 101299860 A | 11/2008 |
| EP | 1 695 502 B1 | 9/2007 |
| GB | 2 428 937 A | 2/2007 |
| JP | 2005-094672 A | 4/2005 |
| JP | 2007-295318 A | 11/2007 |
| KR | 10-2005-0100951 A | 10/2005 |

OTHER PUBLICATIONS

3GPP TS 25.214 V8.3.0 (Sep. 2008); Technical Specification, "3rd Generation Partnership Project; Technical Specification Group Radio Access Network; Physical layer procedures (FDD) (Release 8)," Sep. 2008, pp. 1-89.

3GPP TSG-RAN WG 4 (Radio) Meeting #48bis, Edinburgh, Scotland, R4-082314, Sep. 29-Oct. 3, 2008, pp. 1-3.

3GPP TS 25.331 V8.4.0 (Sep. 2008), Technical Specification, "3rd Generation Partnership Project; Technical Specification Group Radio Access Network; Radio Resource Control (RRC); Protocol Specification (Release 8)," Sep. 2008, pp. 1-5.

3GPP TS 25.308 V8.3.0 (Sep. 2008) Technical Specification, "3rd Generation Partnership Project; Technical Specification Group Radio Access Network; High Speed Downlink Packet Access (HSDPA); Overall decription; Stage 2 (Release 8)," Sep. 2008, pp. 1-4.

Second Office Action dated Feb. 8, 2014, issued by the State Intellectual Property of the P.R.C. in corresponding Chinese Application No. 2009-80153689.9.

* cited by examiner

BASE STATION APPARATUS, MOBILE STATION APPARATUS, COMMUNICATION SYSTEM, BASE STATION APPARATUS CONTROL METHOD, MOBILE STATION APPARATUS CONTROL METHOD, AND RECORDING MEDIUM STORING PROGRAM

CROSS REFERENCE TO RELATED APPLICATIONS

This application is a National Stage of International Application No. PCT/JP2009/007061 filed Dec. 21, 2009, claiming priority based on Japanese Patent Application No. 2009-003505 filed Jan. 9, 2009, the contents of all of which are incorporated herein by reference in their entirety.

TECHNICAL FIELD

The present invention relates to a radio measurement method in a radio communication system including a base station, and related techniques.

BACKGROUND ART

In recent years, as the demand for indoor voice communication and data communication has grown due to the spread of mobile phones, the development of home-use base stations installed indoors has been pursued. As a method of operation of such a home-use base station, a way of implementing communication in which only a pre-registered mobile phone(s) is connected to a home-use base station has been studied in the third generation mobile communication system standardization project called "3GPP (3rd Generation Partnership Project)" (see Non-patent literature 1).

Since a area covered by a home-use base station is considerably smaller than that of a base station installed outdoors, the area is called "home cell". Accordingly, a home-use base station is referred to as "home base station" hereinafter. Further, to distinguish an intended home base station from macro base stations in existing mobile communication networks that are installed in the vicinity of the intended home base station as well as other nearby home base stations, those nearby macro base stations and nearby home base stations are referred to as "adjacent base stations". Further, the areas covered by those adjacent base stations are referred to as "adjacent cells".

The home base station like the one described above has been studied for use in systems such as W-CDMA (Wideband Code Division Multiple Access). Between a home base station and a mobile station, data transmission is performed by using a dedicated channel, of which transmission power is controlled, on the uplink and the downlink, and/or is performed by using a shared channel on the downlink. A home base station and adjacent base stations each transmit a common pilot signal CPICH (Common Pilot Channel). A mobile station performs synchronization establishment, channel estimation, and the like by receiving the common pilot signal, and then performs data transmission/reception with the base station. Therefore, it is necessary to make it possible to receive a common pilot signal with good reception quality in the mobile station in order to provide good communication quality (for example, see Non-patent literature 2). Further, each base station broadcasts cell information including a cell ID at regular intervals by using a BCH (Broadcast Channel), and a mobile station identifies the base station based on the broadcasted cell information.

In base stations in existing mobile communication networks, the transmission power of a common pilot signal to be transmitted in each cell is set in a fixed manner. In contrast to this, as for a common pilot signal transmitted by a home base station in a home cell, a way of autonomously setting its transmission power and frequency by the home base station itself has been studied. Patent literature 1 (page 14, line 8 to page 15, line 21), for example, discloses such a method. Further, it has been also studied to develop a way of operation in which the home base station receives adjacent cell information including an adjacent cell ID, a used frequency, and a primary scrambling code used for encoding from an apparatus on an upper-layer network, measures received power or the like from adjacent cells based on this adjacent cell information, and sets an optimal frequency and transmission power value to be used in the home base station (see Non-patent literature 3). In the method like this, the home base station measures downlink received power RSSI (Received Signal Strength Indicator) from adjacent base stations and/or received power RSCP (Received Signal Code Power) of CPICH for each frequency, sets a frequency having the lowest measurement value for the home base station.

Further, in the W-CDMA system, five states consisting of Idle Mode, URA_PCH, CELL_PCH, CELL_FACH, and CELL_DCH are defined as the communication states of a mobile station (see Non-patent literature 4). A mobile station in a CELL_DCH state specifies a base station to which the mobile station belongs, and communicates with it by using a dedicated channel. Meanwhile, a mobile station in a state other than the CELL_DCH state does not specify the base station to which the mobile station belongs, and selects a base station every time the mobile station transmits control information and the like. In Release 7 of 3GPP, a new state "Enhanced CELL_FACH" was added as another state of a mobile station (see Non-patent literature 5). In Enhanced CELL_FACH, a mobile station in a CELL_FACH state uses HSDPA (High Speed Downlink Packet Access) in order to increase the communication speed. In HSDPA, H-RNTI (HS-DSCH Radio Network Temporary Identifier) is assigned to each mobile station. A control channel HS-SCCH (Shared Control Channel for HS-DSCH) is a channel used to notify control information to a mobile station, and is encoded by using H-RNTI to distinguish a destination mobile station. Specifically, a CRC value, which is added to HS-SCCH, is masked by H-RNTI of the destination mobile station. A mobile station receives HS-SCCH, and when it can be decoded by using the assigned H-RNTI (i.e., when the masked CRC value can be decoded by using its own H-RNTI), the mobile station determines that data destined for that mobile station is being transmitted. Further, an identifier "Common H-RNTI" is also defined to notify information to all mobile stations belonging to a cell. When HS-SCCH is encoded by using Common H-RNTI, all the mobile stations belonging to the cell can receive information included in HS-SCCH.

CITATION LIST

Patent Literature

Patent literature 1: UK Patent Application Publication No. 2428937

Non Patent Literature

Non-patent literature 1: 3GPP TS25.467 V1.0.0 (2008-12), Technical Specification Group Radio Access Network; UTRAN Architecture for 3G Home NodeB; Stage 2 (Release 8)

Non-patent literature 2: 3GPP TS25.214 V8.3.0 (2008-09), Technical Specification Group Radio Access Network; Physical layer procedures (FDD) (Release 8)

Non-patent literature 3: R4-082314 Text Proposal for HNB TR25.9xx: Guidance on HNB Measurements Non-patent literature 4: 3GPP TS25.331 V8.4.0 (2008-09) Radio Resource Control (RRC); Protocol specification Non-patent literature 5: 3GPP TS25.308 V8.3.0 (2008-09) High Speed Downlink Packet Access (HSDPA); Overall Description; Stage 2

SUMMARY OF INVENTION

Technical Problem

When a home base station including a pair of a radio transmitter and a radio receiver attempts to measure an adjacent cell while its home cell is in operation, it is necessary to use the same pair of the radio transmitter and the radio receiver for both the normal cell operation and the measurement of the adjacent cell. Therefore, when the adjacent cell is measured, the radio receiver of the home base station needs to suspend the reception of uplink data transmitted from a mobile station. Further, it is also necessary to carry out the adjacent cell measurement for the frequency used in the home cell. Therefore, to avoid the interference caused by the downlink transmission of the home base station, it is necessary to suspend the downlink transmission by the radio transmitter when the adjacent cell is measured. As a result, the home base station needs to suspend both the transmission and the reception for a mobile station belonging to the home cell when the adjacent cell is measured. However, there is a problem that even if the transmission and reception of the home base station are suspended, the mobile station belonging to the home cell and belonging to an adjacent cell cannot recognize the stop of the transmission and reception immediately.

If a mobile station cannot recognize that the home base station is measuring an adjacent cell, there is concern that the following problems, for example, could occur. Firstly, if a mobile station belonging to the home cell continues the uplink data transmission when the home base station has suspended the reception from the mobile station, the home base station cannot receive the uplink data from the mobile station. As a result, there is a possibility that the mobile station repeats the retransmission for a predetermined number of times, and thus wasting the electrical power at the terminal and increasing the interference to the vicinity.

Further, if a mobile station measures the downlink transmission power of the home cell when the transmission by the home base station has been suspended, there is a possibility that the mobile station determines that the downlink power from the home base station is reduced and performs a hand-over to other cells. As a result, there is a possibility that the traffic and the load on other cells increase due to the hand-over process.

Further, if a mobile station belonging to an adjacent cell measures the downlink power from the home cell when the home base station is measuring the adjacent cell, i.e., when the transmission by the home base station has been suspended, the mobile station cannot carry out a correct measurement. Therefore, there is a possibility that, in a situation where a hand-over should be performed under normal circumstances, no hand-over is performed. It is expected that mobile stations that can connect to a home cell preferentially belong to the home cell, and thereby reducing the load on macro cells. Therefore, there is concern that the mobile station cannot measure the downlink transmission power of the home cell and no hand-over is thereby performed, thus increasing the load on the macro cells.

Accordingly, the present invention has been made in view of the above-described problems, and an object thereof is, when a base station suspends radio transmission/reception with a mobile station while the base station's own cell is in operation and carries out a measurement of a radio signal coming from an adjacent cell, to enable the mobile station to recognize that the adjacent cell is being measured.

Solution to Problem

A base station apparatus according to a first aspect of the present invention is configured to carry out a measurement of a radio signal coming from an adjacent cell while suspending at least one of radio transmission to and radio reception from a mobile station when a base station's own cell is in operation. Further, the base station apparatus is configured to notify, prior to beginning the measurement, advance notice information indicating an execution of the measurement to the mobile station.

A base station apparatus according to a second aspect of the present invention is configured to receive advance notice information from an adjacent base station that carries out a measurement of a radio signal coming from a nearby cell while suspending at least one of radio transmission to and radio reception from a mobile station. The advance notice information is transmitted prior to beginning the measurement in order to notify an execution of the measurement. Further, the base station apparatus according to the second aspect of the present invention is configured to transmit information indicating an implementation of the measurement to a mobile station connecting to a base station's own cell when the advance notice information is received.

A mobile station apparatus according to a third aspect of the present invention is configured to receive advance notice information. Note that the advance notice information indicates that a base station, which is configured to carry out a measurement of a radio signal coming from a nearby cell while suspending at least one of radio transmission to and radio reception from a mobile station, carries out the measurement. Further, the mobile station apparatus according to the third aspect of the present invention is configured to suspend at least one of a transmitting operation and a receiving operation with the base station based on the advance notice information.

A communication system according to a fourth aspect of the present invention includes a first mobile station and a first base station. The first base station is configured to carry out a measurement of a radio signal coming from an adjacent cell while suspending at least one of radio transmission to and radio reception from the first mobile station while the first base station's own cell is in operation. Further, the first base station is configured to transmit, prior to beginning the measurement, advance notice information indicating an implementation of the measurement. Further, the first mobile station is configured to suspend at least one of a transmitting operation of a radio signal to the first base station and a receiving operation of a radio signal from the first base station based on the advance notice information.

A method for controlling a base station apparatus according to a fifth aspect of the present invention includes transmitting, prior to suspending at least one of radio transmission to and radio reception from a mobile station while a base station's own cell is in operation and starting a measurement of a radio signal coming from an adjacent cell, advance notice information indicating an execution of the measurement to the mobile station.

A method for controlling a base station apparatus according to a sixth aspect of the present invention includes:
(a) receiving advance notice information from an adjacent base station that carries out a measurement of a radio signal coming from a nearby cell while suspending at least one of radio transmission to and radio reception from a mobile station, the advance notice information being transmitted prior to beginning the measurement in order to notify an execution of the measurement; and
(b) notifying information indicating an execution of the measurement to a mobile station connecting to a base station's own cell when the advance notice information is received.

A method for controlling a mobile station apparatus according to a seventh aspect of the present invention includes:
(a) receiving advance notice information indicates that a base station, which is configured to carry out a measurement of a radio signal coming from a nearby cell while suspending at least one of radio transmission to and radio reception from a mobile station, carries out the measurement; and
(b) suspending at least one of a transmitting operation of a radio signal to the base station and a receiving operation of a radio signal from the base station based on the advance notice information.

A recording medium storing a program according to an eighth aspect of the present invention is a recording medium storing a program that causes a computer to execute control relating to a base station apparatus. Note that the control includes generating advance notice information prior to suspending at least one of radio transmission to and radio reception from a mobile station while a cell is being operated by the base station apparatus and starting a measurement of a radio signal coming from an adjacent cell, the advance notice information being transmitted in order to notify an execution of the measurement.

A recording medium storing a program according to a ninth aspect of the present invention is a recording medium storing a program that causes a computer to execute control relating to a base station apparatus. Note that the control includes:
(a) acquiring advance notice information from an adjacent base station that carries out a measurement of a radio signal coming from a nearby cell while suspending at least one of radio transmission to and radio reception from a mobile station, the advance notice information being transmitted prior to beginning the measurement in order to notify an execution of the measurement; and
(b) generating information to be transmitted to a mobile station connecting to a cell formed by the base station apparatus based on the advance notice information in order to indicate an execution of the measurement.

A recording medium storing a program according to a tenth aspect of the present invention is a recording medium storing a program that causes a computer to execute control relating to a mobile station apparatus. Note that the control includes:
(a) acquiring advance notice information indicates that a base station, which is configured to carry out a measurement of a radio signal coming from a nearby cell while suspending at least one of radio transmission to and radio reception from a mobile station, carries out the measurement; and
(b) suspending at least one of a transmitting operation of a radio signal to the base station and a receiving operation of a radio signal from the base station based on the advance notice information.

Advantageous Effects of Invention

For example, according to the base station apparatus in accordance with the first aspect of the present invention, when a base station suspends a radio transmission/reception with a mobile station while the base station's own cell is in operation and carries out a measurement of a radio signal coming from an adjacent cell, the mobile station can recognize that the adjacent cell is being measured.

DESCRIPTION OF EMBODIMENTS

Specific exemplary embodiments to which the present invention is applied are explained hereinafter with reference to the drawings. The same signs are assigned to the same components throughout the drawings, and duplicated explanation is omitted as appropriate for simplifying the explanation.

First Exemplary Embodiment of the Invention

Figure 1:
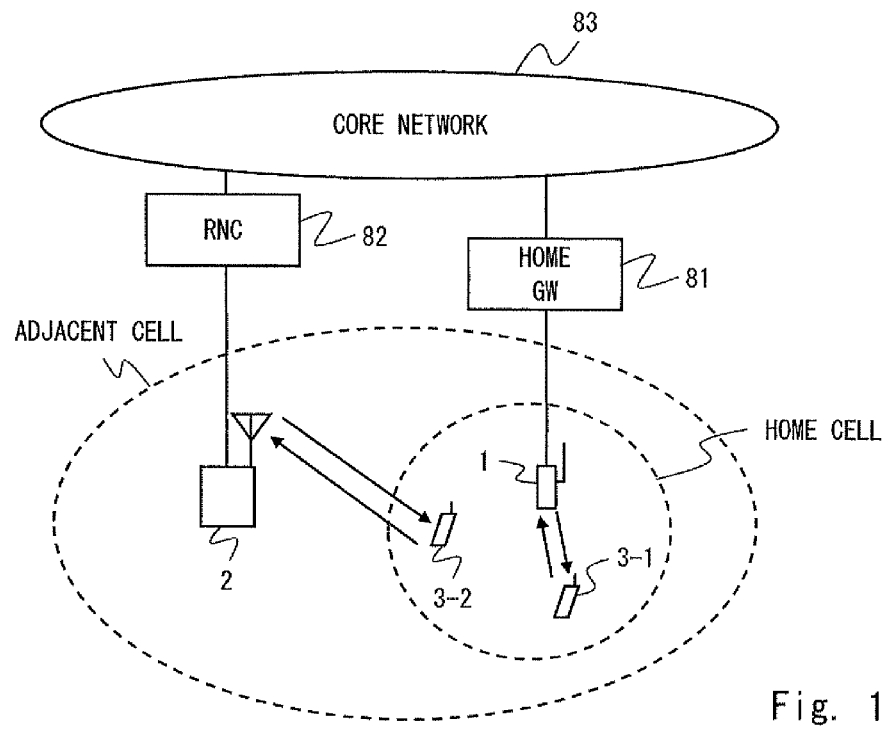
FIG. 1 is a block diagram showing a configuration example of a radio communication system according to a first exemplary embodiment of the invention.

FIG. 1 is a diagram showing a configuration example of a radio communication system according to this exemplary embodiment. Note that the following explanation is made on the assumption that a radio communication system in accordance with this exemplary embodiment is a radio communication system of a FDD (Frequency Division Duplex)-CDMA type, more specifically of a W-CDMA type. Firstly, each component included in FIG. 1 is explained one by one.

A home base station 1 is connected to a core network 83 of a mobile communications company through a home gateway (home GW) 81, and relays traffic between a mobile station 3-1 and the core network 83. The home base station 1 is used in a state where the home base station 1 is connected, for example, to a communication line such as an ADSL (Asymmetric Digital Subscriber Line), an optical fiber, and a coaxial cable, and is connected to the home GW 81 through an IP (Internet Protocol) network such as IP communication network and the Internet.

An adjacent base station 2 generates an adjacent cell and communicates with a mobile station 3-2. In the example shown in FIG. 1, the adjacent cell is a macro cell in a higher layer that is formed so as to cover the home cell (primary cell and secondary cell) generated by the home base station 1. The adjacent base station 2 is connected to the core network 83 through an RNC (Radio Network Controller) 82, and relays traffic between the mobile station 3-2 and the core network 83.

Figure 2:
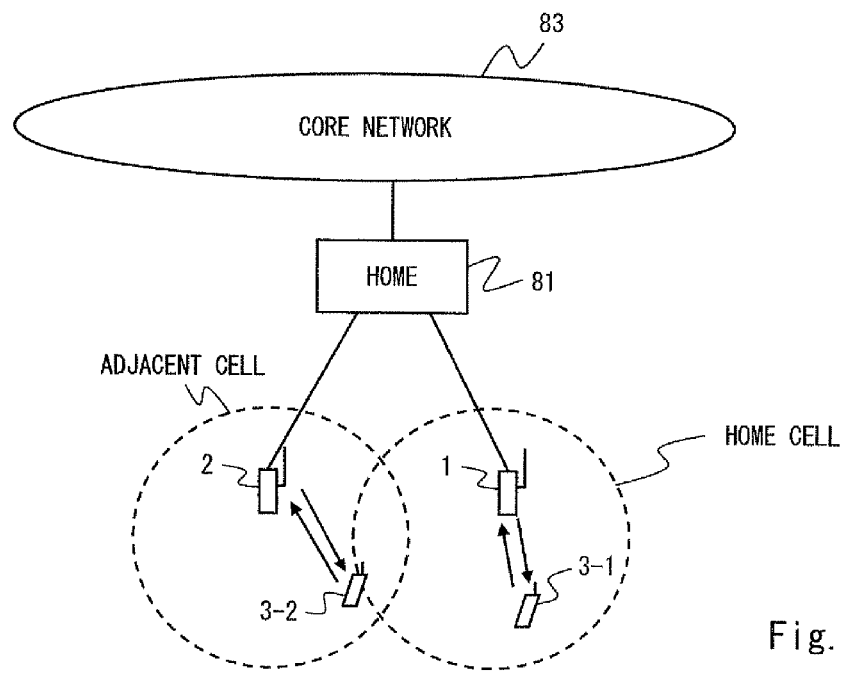
FIG. 2 is a block diagram showing another configuration example of a radio communication system according to a first exemplary embodiment of the invention.

Note that although only one adjacent cell is illustrated in FIG. 1, the number of adjacent base station 2 and the adjacent cell may be more than one. Further, the number of mobile stations connecting to the home cell may be also more than one. The number of mobile stations connecting to the adjacent cell(s) may be also more than one. Further, as shown in FIG. 2, the adjacent base station 2 may be a home base station. Note that the adjacent base station 2 shown in FIG. 2 may be connected to the core network 83 through a home GW that is different from the home GW 81.

The home base station 1 measures the reception quality of a radio signal transmitted from the adjacent cell, and determines a frequency that is used to form its own home cell by using the measurement result. Further, the home base station 1 measures the reception quality even after home base station 1 starts the operation of the home cell, and re-determines a frequency for the home cell by using the measurement result. Note that the reception quality measurement that is carried out after the operation of the home cell is started may be carried out at regular intervals, or may be carried out according to execution instructions from an operator.

Note that there is a possibility that the frequency that is used in the currently-operated home cell is also used in the adjacent cell. Therefore, the home base station 1 also measures the reception quality for the frequency used in the currently-operated home cell. Accordingly, at least when a measurement is performed for the frequency used in the currently-operated home cell, the home base station 1 suspends radio transmission to and radio reception from the mobile station 3-1 connecting to the home cell. Note that in order to reduce the device costs, a radio receiver that is used to receive a radio signal transmitted from the mobile station 3-1 may be also used as a radio receiver that receives a radio signal coming from an adjacent cell. In this case, the home base station 1 suspends the radio reception from the mobile station 3-1 even when the reception quality measurement is carried out for a frequency that is different from the frequency used in the home cell.

In order to prevent the occurrence of the problems that would be otherwise caused by the fact that the mobile station 3-1 cannot recognize that the adjacent cell is being measured, the home base station 1 operates in the following manner. That is, when at least one of radio transmission to and radio reception from the mobile station 3-1 is suspended while the home cell is in operation and the measurement of a radio signal coming from the adjacent cell is started, the home base station 1 transmits a measurement advance notice (advance notice information) indicating the implementation of measurement to the mobile station 3-1 prior to the start of the measurement. In this way, the mobile station 3-1 can recognize that the home base station 1 will start the measurement of an adjacent cell by the reception of the measurement advance notice. For example, when the mobile station 3-1 receives the measurement advance notice, it may suspends at least one of the transmitting operation of a radio signal to the home base station 1 and the receiving operation of a radio signal from the home base station 1.

Figure 3:
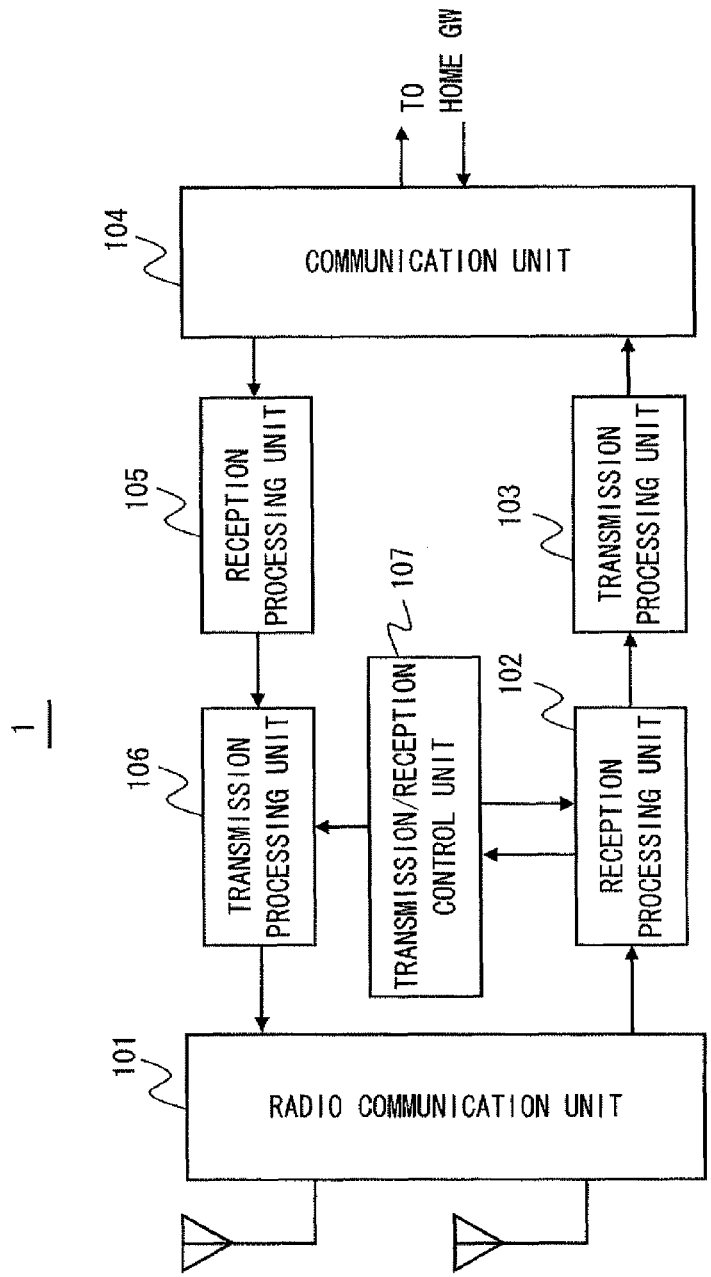
FIG. 3 is a block diagram showing a configuration example of a home base station included in FIG. 1.

Next, configuration examples of the home base station 1 and the mobile station 3-1 are explained with reference to FIGS. 3 and 4. FIG. 3 is a block diagram showing a configuration example of the home base station 1. Note that FIG. 3 shows only the part relating to the measurement of an adjacent cell performed by the home base station 1, and the remaining part of the configuration is omitted. In FIG. 3, a radio communication unit 101 performs a radio communication with the mobile station 3-1. A reception processing unit 102 processes an uplink signal received from the mobile station 3-1 located within the home cell. A transmission processing unit 103 performs a process to transmit transfer data among the uplink signal processed by the reception processing unit 102 to an apparatus (home GW 81) on an upper-layer network. A communication unit 104 communicates with the upper-layer network apparatus. When the communication unit 104 receives a downlink signal from the home GW 81, it transfers the received signal to a reception processing unit 105. The downlink signal transferred to the reception processing unit 105 is transmitted to the radio communication unit 101 through a transmission processing unit 106 and then to the mobile station 3-1.

An operation relating to the measurement of an adjacent cell performed by the home base station 1 is explained hereinafter. When the reception processing unit 102 receives an instruction to measure an adjacent cell from a transmission/reception control unit 107, the reception processing unit 102 measures a radio signal of the adjacent cell in a predefined transmission/reception stop pattern. For example, it may measure CPICH received power (RSCP), downlink RSSI, or the like. Note that the measurement of the adjacent cell may be carried out for all the frequency ranges that the home base station 1 can use. Further, the transmission/reception stop pattern indicates a period during which at least one of radio transmission to and radio transmission from the mobile station 3-1 is intermittently stopped. In other words, the transmission/reception stop pattern indicates the timing at which synchronization verification between the base station 1 and the mobile station 3-1 as well as transmission to the mobile station 3-1 or reception from the mobile station 3-1 by the base station 1 for the notification of an outgoing/incoming call or the like is performed.

The reception processing unit 102 transfers the measurement result of the adjacent cell to the transmission/reception control unit 107. The transmission/reception control unit 107 analyzes the measurement result of the adjacent cell transferred from the reception processing unit 102, and determines a frequency to be assigned to the home cell. For example, the transmission/reception control unit 107 may select a frequency having the lowest interference level as the frequency to be assigned to the home cell from among the available frequencies for which the measurement was carried out. The transmission/reception control unit 107 notifies the determined frequency setting information to the transmission processing unit 106.

Further, when the transmission/reception control unit 107 starts the measurement of the adjacent cell, it sets a transmission/reception stop pattern. The transmission/reception stop pattern is notified from the radio communication unit 101 to the mobile station 3-1 located within the home cell through the transmission processing unit 106. The transmission/reception stop pattern may be included in the above-described measurement advance notice. Further, the transmission/reception control unit 107 administers the states of all the mobile stations connected to the home cell including the mobile station 3-1, and distinguishes a mobile station in a CELL_DCH state.

Further, the transmission/reception control unit 107 may control the transmission processing unit 106 so that information indicating the end of the measurement (hereinafter called "measurement end notice") is transmitted to the mobile station 3-1. Note that when the measurement advance notice includes any information that can be used to recognize the measurement end timing, the transmission of the measurement end notice may be omitted.

Next, a configuration example of the mobile station 3-1 is explained. FIG. 4 is a block diagram showing an example of a configuration of the mobile station 3-1. Note that FIG. 4 shows only the part relating to the measurement of an adjacent cell performed by the home base station 1, and the remaining part of the configuration is omitted. In FIG. 4, a radio communication unit 301 performs a radio communication with the home base station 1. A reception processing unit 302 receives data from the home base station 1. Further, when the received data is a measurement advance notice, the reception processing unit 302 transfers the received data to a transmission/reception control unit 304. The transmission/reception control unit 304 controls the suspension and restart of the radio reception from the home base station 1 and the radio transmission to the home base station 1 based on the measurement advance notice. Specifically, the reception processing unit 302 performs the start or the stop of the reception power measurement of a common pilot channel of the home base station 1 under instructions from the transmission/reception control unit 304. A transmission data control unit 303 performs the start or the stop of uplink data transmission under instructions from the transmission/reception control unit 304.

Figure 5:
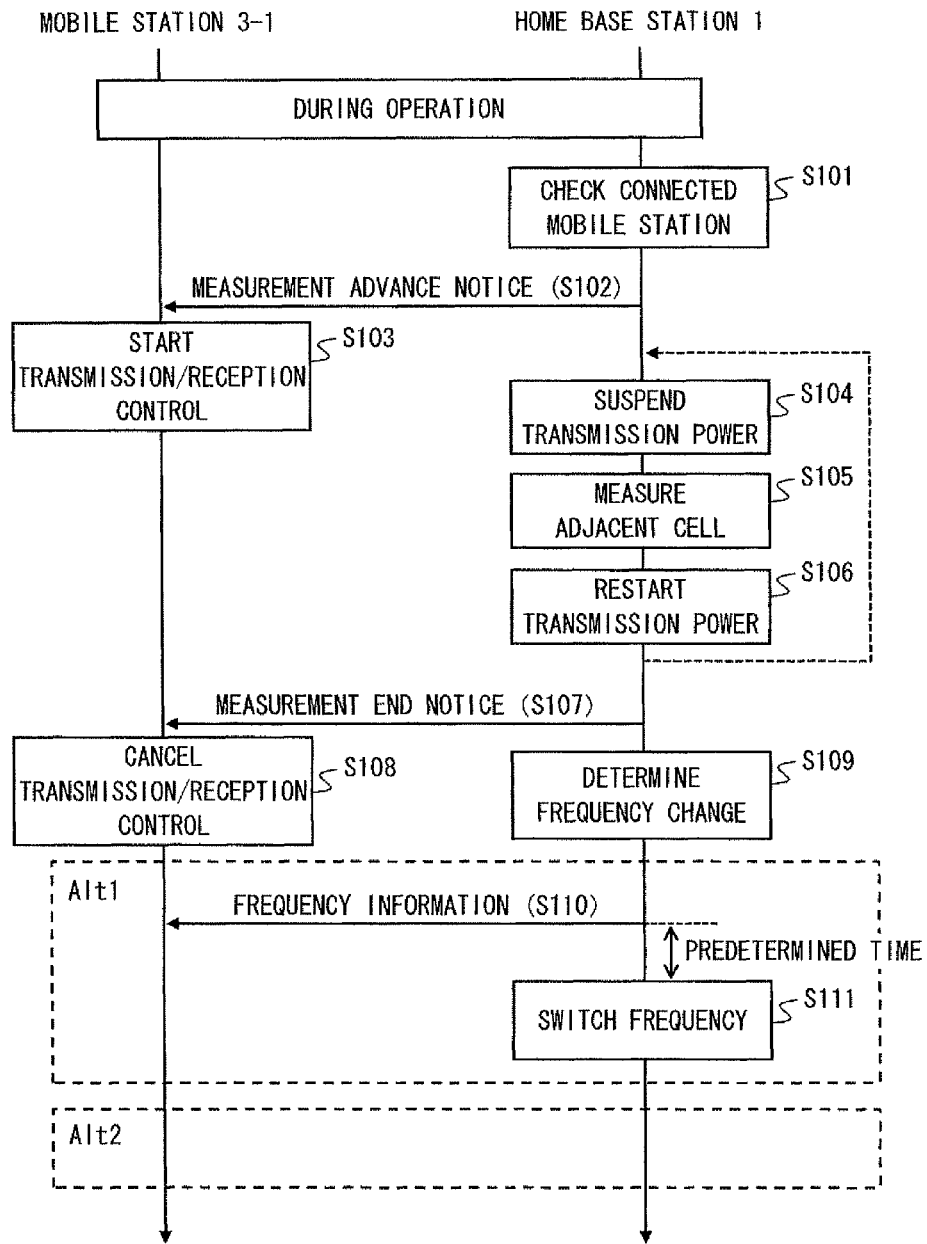
FIG. 5 is a sequence diagram showing an example of an adjacent cell measurement procedure in a first exemplary embodiment of the invention.

Next, a specific example of a procedure for measuring an adjacent cell performed when the home cell is in operation is explained hereinafter. FIG. 5 is a sequence diagram showing an example of an adjacent cell measurement procedure. The home base station 1 and the mobile station 3-1 are in operation.

In a step S101, the transmission/reception control unit 107 of the home base station 1 checks the connection status of a mobile station(s) (mobile station 3-1 and the like) located in the home cell. If there is a mobile station in a CELL_DCH state, the transmission/reception control unit 107 does not perform the measurement of the adjacent cell. Then, after a predetermined time period, the transmission/reception control unit 107 checks the connection status of the mobile station(s) again. On the other hand, if there is not any mobile station in a CELL_DCH state, the transmission/reception control unit 107 notifies transmission/reception stop pattern information to the reception processing unit 102 and the transmission processing unit 106. The transmission processing unit 106 transmits a measurement advance notice including the notified transmission/reception stop pattern information to the mobile station 3-1 (step S102).

The transmission processing unit 106 may transmit the measurement advance notice by using a channel that can be received by all the mobile stations belonging to the home cell. For example, a broadcast channel BCH may be used for the transmission of the measurement advance notice. Further, a shared channel that can be received by all the mobile stations belonging to the home cell, in particular HS-SCCH encoded by Common H-RNTI may be used for the transmission of the measurement advance notice. Further, an RRC massage such as "Radio Bearer Reconfiguration" may be also used for the transmission of the measurement advance notice. Note that details of the RRC massage are explained in Patent literature 4. Further, the measurement advance notice may be transmitted by using a broadcast channel BCH and a shared channel (e.g., HS-SCCH). The measurement end notice may be also transmitted by using the same or similar transmission methods to those for the measurement advance notice.

When the reception processing unit 302 of the mobile station 3-1 receives the measurement advance notice, it transfers the received measurement advance notice to the transmission/reception control unit 304. The transmission/reception control unit 304 restricts the transmission/reception with the home base station 1 based on the transmission/reception stop pattern information included in the measurement advance notice (step S103). Specifically, the transmission/reception control unit 304 restricts the uplink transmission for the transmission data control unit 303, and also restricts the reception power measurement of the downlink pilot channel performed for the reception processing unit 302.

In a step S104 after the transmission of the measurement advance notice, the transmission/reception control unit 107 of the home base station 1 suspends the downlink transmission of the radio communication unit 101 according to the transmission/reception stop pattern. While the transmission is suspended, the reception processing unit 102 measures the adjacent cell (step S105). When the measurement of the adjacent cell is completed, the transmission/reception control unit 107 restarts the downlink transmission of the radio communication unit 101 (step S106). The transmission/reception control unit 107 controls the transmission processing unit 106 so that a measurement end notice indicating the end of the measurement is transmitted to the mobile station 3-1 (step S107). On the other hand, when the measurement of the adjacent cell for all the available frequencies is not completed, the transmission/reception control unit 107 returns to the step S104, suspends the downlink transmission again, and measures the adjacent cell.

When the reception processing unit 302 of the mobile station 3-1 receives the measurement end notice, it transfers the received measurement end notice to the transmission/reception control unit 304. Upon receiving the measurement end notice, the transmission/reception control unit 304 notifies the cancellation of the restrictions on the uplink transmission and the downlink power measurement to the reception processing unit 302 and the transmission processing unit 305 (step S108).

In a step S109, the transmission/reception control unit 107 enters a phase in which the transmission/reception control unit 107 makes a decision on the measurement result of the adjacent cell. For example, in the decision phase of the measurement result, it may determine whether or not there is any frequency having lower RSCP received power than that of the currently-used frequency. Further, it may determine whether or not there is any frequency of which the measured RSSI value is lower than that of the currently-used frequency. If there is any frequency that satisfies the condition, the home base station 1 starts a procedure to switch to that frequency having lower received power (step S111). Note that prior to the switching of the frequency channel, the home base station 1 transmits information about the newly-used frequency (channel setting information) from the transmission processing unit 106 to the mobile station 3-1 (step S109). The home base station 1 switches the frequency to be used after a lapse of a predetermined time from the transmission of the channel setting information. Further, the transmission/reception control unit 304 of the mobile station 3-1 switches to the received frequency within a predetermined time period based on the received channel setting information.

Figure 6:
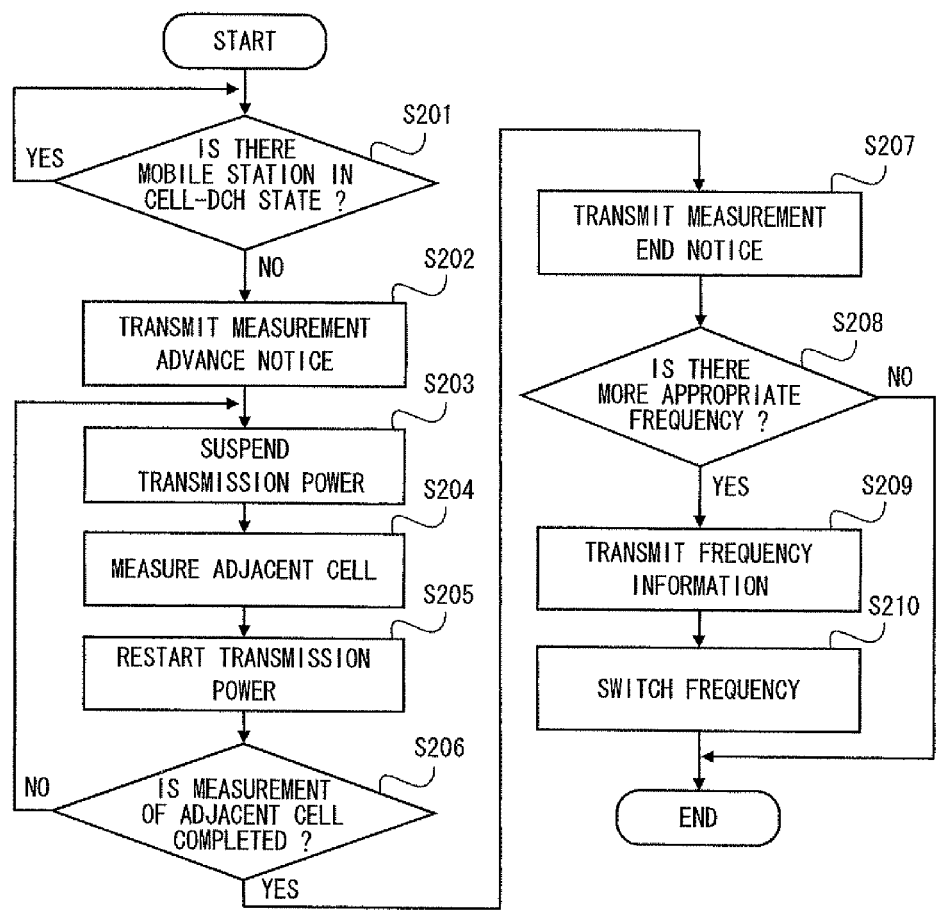
FIG. 6 is a flowchart showing a specific example of an adjacent cell measurement procedure performed by a home base station.

Next, each of a procedure for measuring an adjacent cell performed by the home base station 1, a procedure for suspending/restarting transmission/reception performed by the mobile station 3-1, and a procedure for switching a frequency performed by the mobile station 3-1 is explained separately. FIG. 6 is a flowchart showing an operation for an adjacent cell measurement performed by the transmission/reception control unit 107. The home base station 1 starts the operation shown in FIG. 6 in response to the start of an adjacent cell measurement.

In a step S201, the home base station 1 checks the connection status of all the mobile stations (mobile station 3-1 and the like) belonging to the home cell. If there is a mobile station in a CELL_DCH state, the operation of the adjacent cell measurement is suspended. Then, after a predetermined time period, the step S201 is performed again. If there is not any mobile station in a CELL_DCH state, the home base station 1 transmits a measurement advance notice including transmission/reception stop pattern information (step S202). In a step S203, the home base station 1 suspends the downlink transmission power in a predetermined transmission/reception stop pattern. In a step S204, the home base station 1 measures an adjacent cell while the transmission power is suspended. For example, the home base station 1 may measure the received power (RSCP) of a downlink pilot channel for each frequency. In a step S205, the measurement is stopped according to the predetermined transmission/reception stop pattern and restarts the downlink transmission (step S205).

In a step S206, the home base station 1 determines the measurement completion status of the adjacent cell. When the measurement of the received power of the pilot channel is completed for all the frequencies, the home base station 1 transmits a measurement end notice indicating the end of the measurement (step S207). When the measurement is not completed, the home base station 1 returns to the step S203 and carries out the measurement of the adjacent cell again.

In a step S208, the home base station 1 makes a decision on the measurement result of the adjacent cell. For example, it may determine whether or not there is a more appropriate frequency than the frequency currently used in the home cell through the following procedure. Firstly, it is determined whether or not there is any measured RSCP value PrsCp of CPICH that is lower than that in the frequency currently used in the home cell among the measured RSCP values PrsCp.fx (x=1, 2, ... ) of CPICH in all the available frequencies that the home base station 1 can use. When there is a frequency that satisfies the condition (i.e., PrsCp.fx<PrsCp), the process goes to a step S209 for switching the frequency of the home cell. On the other hand, when there is not any frequency that satisfies the condition (i.e., PrsCp.fx<PrsCp), the home base station 1 finishes the operation process for the adjacent cell measurement to continue to use the currently used frequency.

In a step S209, the home base station 1 transmits information on the frequency having the lowest measured RSCP value of CPICH determined in the step S208 (channel setting information) to the mobile station 3-1. The home base station 1 switches the frequency after a lapse of a predetermined time from the transmission of the channel setting information (step S210), and finishes the process.

Figure 7:
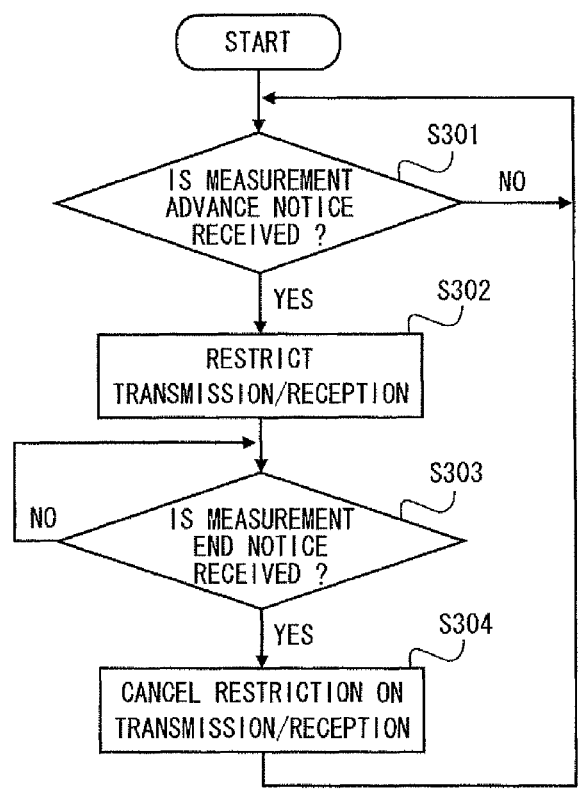
FIG. 7 is a flowchart showing a specific example of a transmission/reception suspension/restart procedure performed by a mobile station connected to a home cell.

Next, a specific example of a transmission/reception suspension/restart procedure performed by the mobile station 3-1 is explained with reference to a flowchart shown in FIG. 7. The mobile station 3-1 starts the operation shown in FIG. 7 in response to the reception of a measurement advance notice broadcasted by the home base station 1.

In a step S301, when the mobile station 3-1 receives a measurement advance notice broadcasted by the home base station 1, it restricts the uplink transmission and the downlink power measurement based on transmission/reception stop pattern information (step S302). If the mobile station 3-1 has not received any measurement advance notice, it repeats the determination in the step S301.

In a step S303, when the mobile station 3-1 receives a measurement end notice broadcasted by the home base station 1, it cancels the restrictions on the uplink transmission and the downlink power measurement (step S304), and returns to the step S301. If the mobile station 3-1 has not received the measurement end notice, it repeats the determination in the step S303.

Figure 8:
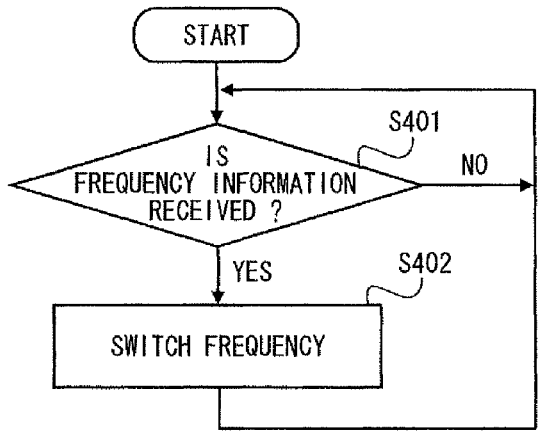
FIG. 8 is a flowchart showing a specific example of a frequency switching procedure performed by a mobile station connected to a home cell.

Next, a specific example of a frequency switching procedure performed by the mobile station 3-1 is explained with reference to a flowchart shown in FIG. 8. In response to the reception of frequency information (channel setting information) from the home base station 1, the mobile station 3-1 starts the operation shown in FIG. 8.

In a step S401, when the mobile station 3-1 receives frequency information broadcasted by the home base station 1, it goes to a step S402 for switching the frequency. If the frequency information has not been received, it returns to the step S401 for waiting for the reception of frequency information.

In a step S402, the mobile station 3-1 switches the frequency based on the received frequency information, and returns to the step S401 for waiting for the reception of frequency information again.

As described above, since the home base station 1 notifies a measurement advance notice to the mobile station 3-1 belonging to the home cell, the mobile station 3-1 can recognize the transmission/reception stop pattern. Therefore, it is possible to prevent the occurrence of the problems that would be otherwise caused by the fact that the mobile station 3-1 cannot recognize the start of an adjacent cell measurement. For example, it is possible to prevent the occurrence of undesired hand-over operations by the mobile station 3-1, and to prevent the increases in the traffic and the uplink interference level that would be otherwise caused by the fact that the mobile station 3-1 would continue the uplink data transmission during the measurement of the adjacent cell.

Incidentally, the process to transmit a measurement advance notice by the transmission/reception control unit 107 that is required for the measurement of the adjacent cell may be implemented by using a semiconductor processing device such as ASIC and DSP. Further, this process may be also implemented by making a computer such as a microprocessor execute a control program in which the processing procedure explained above with reference to FIG. 6 is described. This control program can be stored in various types of storage media, or can be transmitted through a communication medium. Example of the storage media include flexible discs, hard disk drives, magnetic discs, magneto-optic discs, CD-ROMs, DVDs, ROM cartridges, RAM memory cartridges with battery backup, flash memory cartridges, and nonvolatile RAM cartridges. Further, examples of the communication medium include wired communication media such as telephone lines, wireless communication media such as microwave lines, and Internet.

Further, the process relating to the restriction/restart of the radio transmission/reception performed by the transmission/reception control unit 304 of the mobile station 3-1 may be also implemented by making a computer such as ASIC, DSP, and a microprocessor execute a control program in which the processing procedure explained above with reference to FIG. 7 is described.

Second Exemplary Embodiment of the Invention

A configuration example of a radio communication system according to this exemplary embodiment may be similar to the configuration example explained above with reference to FIG. 1 or 2. In this exemplary embodiment, "the mobile station 3-2 belonging to the adjacent cell" recognizes that the home base station 1 is measuring the adjacent cell. To realize this feature, the adjacent base station 2 according to this exemplary embodiment receives a measurement advance notice (and, if necessary, a measurement end notice) transmitted by the home base station 1. Then, when the adjacent base station 2 receives the measurement advance notice (measurement end notice), it notifies measurement start information indicating the execution of the measurement by the home base station 1 (and measurement end information indicating the end of the measurement) to the mobile station 3-2 located within the adjacent cell.

When the mobile station 3-2 within the adjacent cell receives the measurement start information, it excludes the home base station 1 (home cell) from the target of the received power measurement of the pilot channel in nearby cells for which the received power of the pilot channel is to be measured to determine whether hand-over should be performed or not. After that, when measurement end information is received, the mobile station 3-2 cancels the exclusion of the home base station 1 (home cell).

Figure 9:
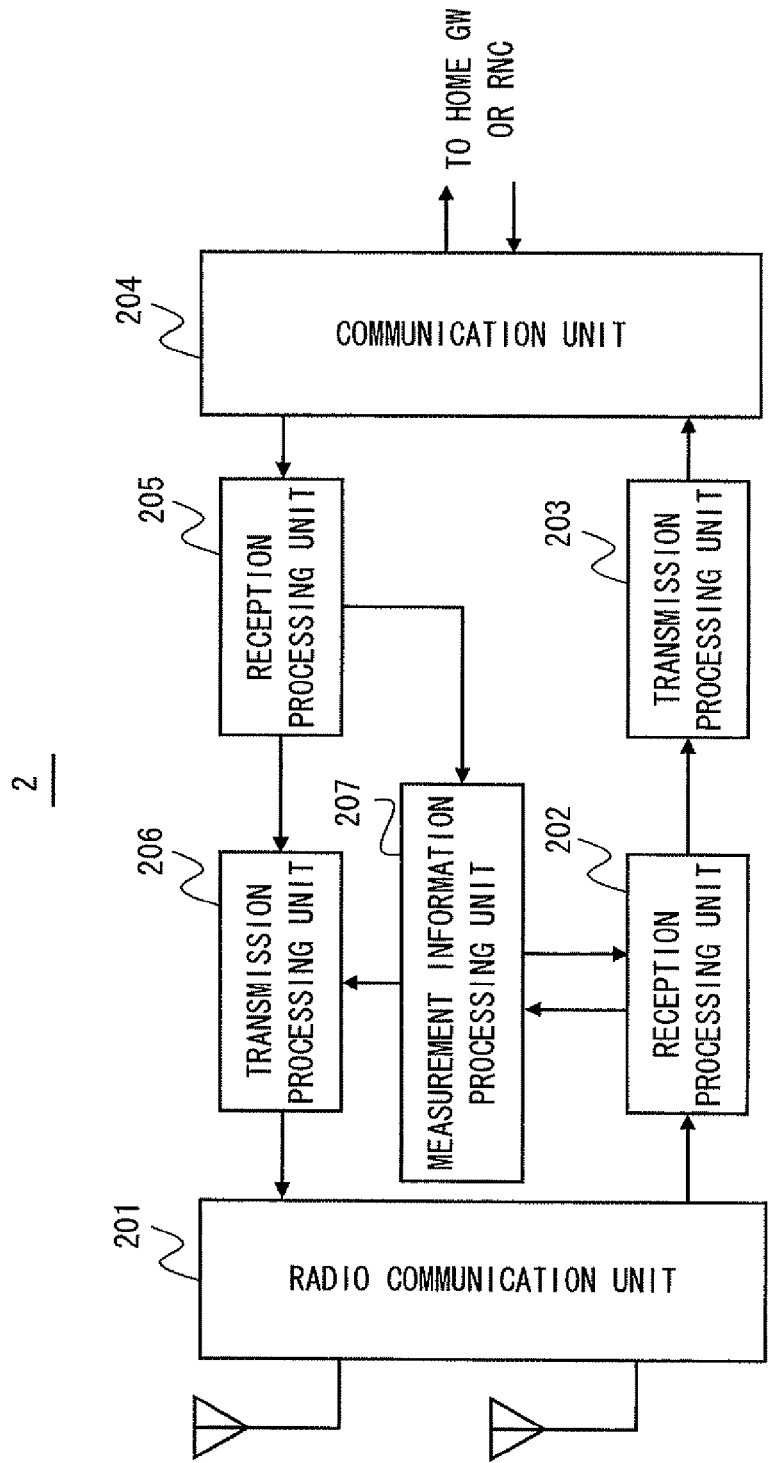
FIG. 9 is a block diagram showing a configuration example of an adjacent base station according to a second exemplary embodiment of the invention.

FIG. 9 is a block diagram showing an example of the adjacent base station 2 according to this exemplary embodiment. In FIG. 9, a radio communication unit 201 performs a radio communication with the mobile station 3-2. A reception processing unit 202 processes an uplink signal received from a mobile station located within the adjacent cell. A transmission processing unit 203 performs a process for transmitting transfer data among the uplink signal processed in the reception processing unit 202 to an apparatus on an upper-layer network. A communication unit 204 communicates with the upper-layer network apparatus. Note that when the adjacent base station 2 is a macro base station, the upper-layer network apparatus is the RNC 82, whereas when the adjacent base station 2 is a home base station, the upper-layer network apparatus is the home GW 81 or other home GWs. When a communication unit 204 receives a downlink signal from the upper-layer network apparatus, it transfers the received signal to a reception processing unit 205. The downlink signal transferred to the reception processing unit 205 is transferred to the radio communication unit 201 through a transmission processing unit 206.

Broadcasting operations of a measurement advance notice and a measurement end notice performed by the adjacent base station 2 are explained hereinafter. When the reception processing unit 205 receives adjacent cell information from the upper-layer network apparatus, it transfers the received information to a measurement information processing unit 207. The measurement information processing unit 207 supplies the adjacent cell information to the reception processing unit 202. The reception processing unit 202 receives a broadcast channel BCH transmitted by the home base station 1 based on the adjacent cell information supplied from the measurement information processing unit 207. When the reception processing unit 202 obtains a measurement advance notice or a measurement end notice through the broadcast channel BCH, it transfers the received notice to the measurement information processing unit 207. When the measurement advance notice or the measurement end notice is transferred from the reception processing unit 202, the measurement information processing unit 207 generates measurement start information or measurement end information to be broadcasted within its own cell (i.e., to the adjacent cell in FIG. 1), and supplies this generated information to the transmission processing unit 206. The transmission processing unit 206 broadcasts the measurement start information or the measurement end information notified from the measurement information processing unit 207 within the cell.

Note that in the above explanation, an example where the home base station 1 transmits a measurement advance notice and a measurement end notice by using the broadcast channel BCH is shown. In this case, the adjacent base station 2 may receive BCH of the home base station 1 by using the primary scrambling code of the home base station 1 included in the adjacent cell information. Note that the home base station 1 may transmit the measurement advance notice and the measurement end notice by using a channel that can be received by a radio station that is not connected to the home cell such as the adjacent base station 2. Further, the transmission of the measurement advance notice and the measurement end notice from the home base station 1 to the adjacent base station 2 may be carried out through the core network 83. Further, the transmission of the measurement start information or the measurement end information to the mobile stations within the adjacent cell may be carried out by using a method that enables all the mobile stations connecting to the adjacent cell to receive the measurement start information or the measurement end information. For example, BCH, HS-SCCH encoded by Common H-RNTI, or an RRC message may be used.

Figure 4:
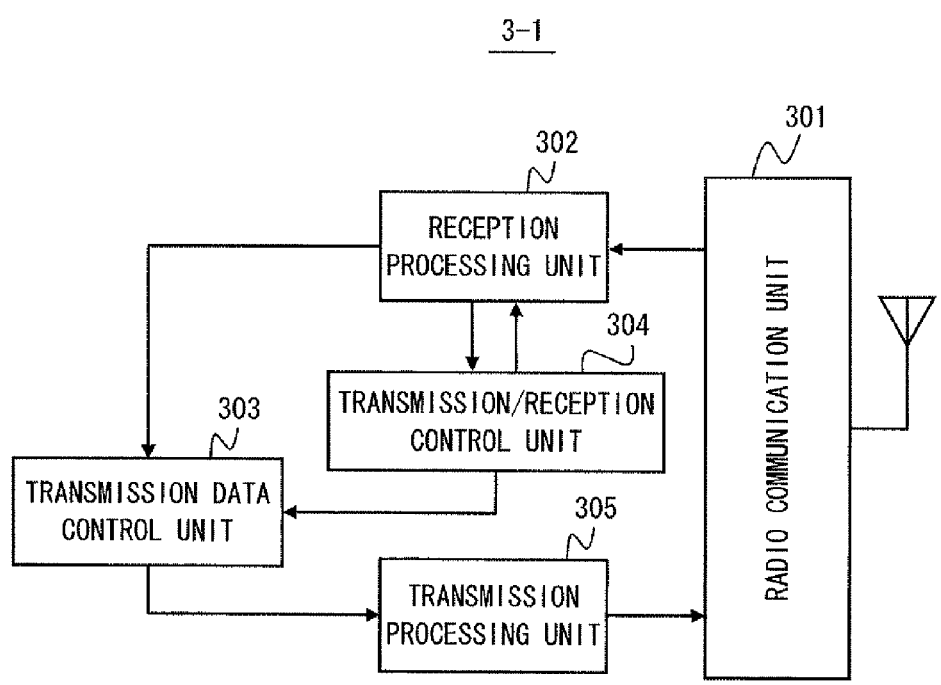
FIG. 4 is a block diagram showing a configuration example of a mobile station included in FIG. 1.

A configuration of the mobile station 3-2 belonging to the adjacent cell may be similar to the above-described configuration shown in FIG. 4.

Figure 10:
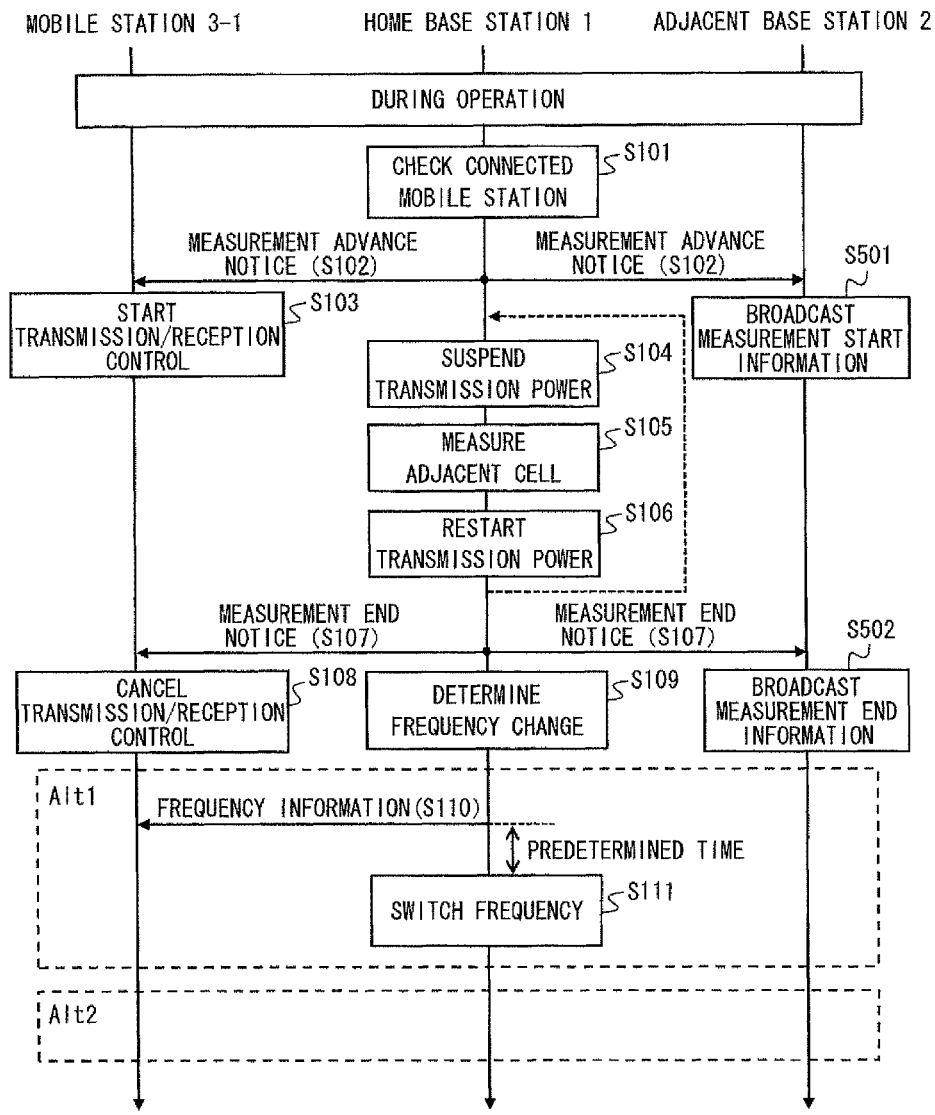
FIG. 10 is a sequence diagram showing an example of an adjacent cell measurement procedure in a second exemplary embodiment of the invention.

FIG. 10 is a sequence diagram showing an example of an adjacent cell measurement procedure in this exemplary embodiment. The home base station 1, the adjacent base station 2, and the mobile station 3-1 are in operation. Further, assume that the adjacent base station 2 is already notified of the adjacent cell information from an upper-layer network apparatus. Note that the processing procedure performed by the home base station 1 and the mobile station 3-1 in FIG. 10 is the same as the above-described processing procedure shown in FIG. 5, and therefore its duplicated explanation is omitted.

When the reception processing unit 202 of the adjacent base station 2 receives a measurement advance notice transmitted from the home base station 1, it transfers the received notice to the measurement information processing unit 207. The measurement information processing unit 207 generates measurement start information. The measurement start information includes transmission/reception stop pattern information included in the measurement advance notice, identification information of the transmission source, i.e., home base station 1 (or home cell), and the like. The measurement start information is transmitted from the radio communication unit 201 to a mobile station(s) located within the adjacent cell (step S501).

Further, when the reception processing unit 202 of the adjacent base station 2 receives a measurement end notice transmitted from the home base station 1, it transfers the received notice to the measurement information processing unit 207. The measurement information processing unit 207 generates measurement end information. The measurement end information includes identification information of the transmission source, i.e., home base station 1 (or home cell), and the like. The measurement end information is transmitted from the radio communication unit 201 to the mobile station(s) located within the adjacent cell (step S502).

Figure 11:
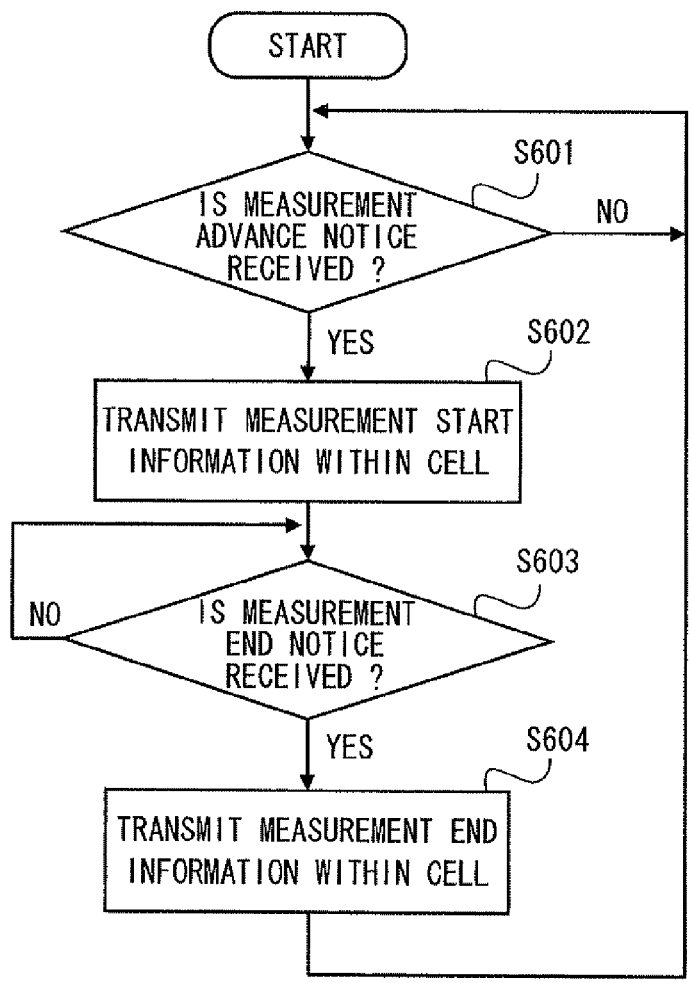
FIG. 11 is a flowchart showing an operation example of an adjacent base station.

Next, each of a procedure for transmitting measurement start information and measurement end information performed by the adjacent base station 2 and a procedure for suspending/restarting reception performed by the mobile station 3-2 is explained separately. FIG. 11 is a flowchart showing a specific example of an operation of the measurement information processing unit 207 of the adjacent base station 2. The measurement information processing unit 207 starts the operation shown in FIG. 11 in response to the reception of a measurement advance notice transmitted by the home base station 1.

In a step S601, when the adjacent base station 2 receives a measurement advance notice from the home base station 1, it transmits the above-described measurement start information for its own cell (adjacent cell in FIG. 1) (step S602). In the step S601, if the adjacent base station 2 has not received the measurement advance notice, it repeats the determination in the step S601.

In a step S603, if the adjacent base station 2 receives a measurement end notice from the home base station 1, it transmits the above-described measurement end information for its own cell (adjacent cell in FIG. 1) (step S604), and returns to the step S601. In a step S603, if the measurement end notice has not been received, the adjacent base station repeats the determination in the step S603.

Figure 12:
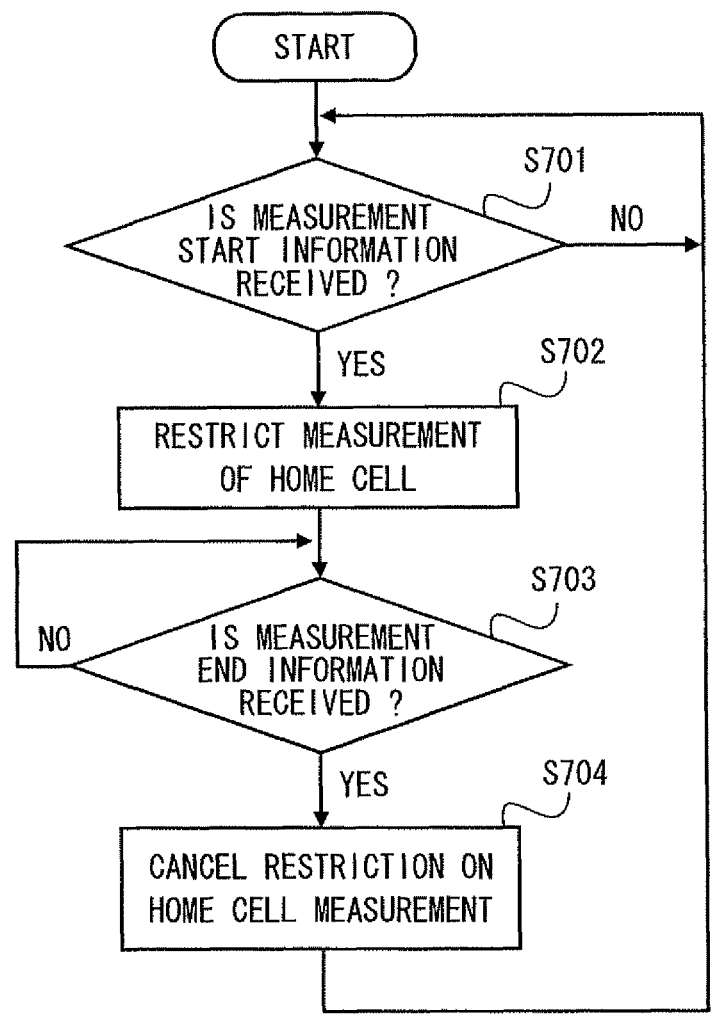
FIG. 12 is a flowchart showing a specific example of a reception suspension/restart procedure performed by a mobile station connected to an adjacent cell.

FIG. 12 is a flowchart showing an operation example of the transmission/reception control unit 304 performed when the mobile station 3-2 belonging to the adjacent cell receives measurement start information and measurement end information from the adjacent base station 2. The mobile station 3-2 starts the operation shown in FIG. 12 in response to the reception of measurement start information.

In a step S701, the mobile station 3-2 determines whether or not the mobile station 3-2 has received measurement start information transmitted from the adjacent base station 2. If the measurement start information is received, the mobile station 3-2 restricts the downlink power measurement of the home cell in the period during which the home base station 1 is measuring the adjacent cell based on the transmission/reception stop pattern information included in the measurement start information (step S702). Note that the mobile station 3-2 may suspend the RSCP measurement of the home cell formed by the home base station 1 selectively, or may entirely suspend the RSCP measurement of the nearby cells that is carried out for the hand-over decision. In the step S701, if the mobile station 3-2 has not received the measurement start information, it repeats the determination in the step S701.

In a step S703, the mobile station 3-2 determines whether or not the mobile station 3-2 has received measurement end information transmitted from the adjacent base station 2. If the measurement end information is received, the mobile station 3-2 cancels the restrictions on the measurement of the home cell (step S704), and returns to the step S701. In the step S703, if the mobile station 3-2 has not received the measurement end information, it repeats the determination in the step S703.

As described above, in this exemplary embodiment, when the adjacent base station 2 receives a measurement advance notice transmitted by the home base station 1, the adjacent base station 2 transmits measurement start information of the home base station 1 generated based on the received measurement advance notice to a mobile station(s) within its own cell.

In this way, the mobile station 3-2 belonging to the adjacent cell can recognize the transmission stop of the home base station 1. Therefore, it is possible to prevent the occurrence of undesired hand-over operations by the mobile station 3-2.

Note that the process relating to the transmission of the measurement start information and the measurement end information performed by the measurement information processing unit 207 of the adjacent base station 2 may be implemented by making a computer such as ASIC, DSP, and a microprocessor execute a control program in which the processing procedure explained above with reference to FIG. 11 is described. Further, the process relating to the restriction/restart of the radio reception performed by the transmission/reception control unit 304 of the mobile station 3-2 may be also implemented by making a computer such as ASIC, DSP, and a microprocessor execute a control program in which the processing procedure explained above with reference to FIG. 12 is described.

In the above-described exemplary embodiments 1 and 2, examples where the home base station 1 transmits a measurement advance notice including a transmission/reception stop pattern are shown. However, when the mobile stations 3-1 and 3-2 already possess knowledge of the transmission/reception stop pattern, the home base station 1 does not need to notify the transmission/reception stop pattern to the mobile stations 3-1 and 3-2. That is, what needs to be included in the measurement advance notice is the information that can be used to recognize that measurement will be started or that at least one of transmission and reception by the mobile station will be suspended. By receiving the measurement advance notice including that recognition information, the mobile station 3-1 can recognize the start of the measurement performed by the home base station 1 and thereby can suspend the transmission to and reception from the home base station 1.

Further, in the above-described first and second exemplary embodiments, cases where the present invention is applied to W-CDMA type base stations are explained. However, the application of the present invention is not limited to W-CDMA type base stations. For example, the present invention can be also applied to radio communication systems adopting a TDD (Time Division Duplex) scheme in which the same radio frequency is used in both the uplink and downlink in a time-division manner. Further, the present invention can be also applied to radio communication systems adopting a 3GPP LTE scheme.

Further, the present invention is not limited to the above-described exemplary embodiments, and needless to say, various modifications can be made without departing from the spirit of the present invention described above.

This application is based upon and claims the benefit of priority from Japanese patent application No. 2009-003505, filed on Jan. 9, 2009, the disclosure of which is incorporated herein in its entirety by reference.

REFERENCE SIGNS LIST

1 home base station
2 adjacent base station
3-1, 3-2 mobile station
81 home gateway (home GW)
82 Radio Network Controller (RNC)
83 core network
101 radio communication unit
102 reception processing unit
103 transmission processing unit
104 communication unit
105 reception processing unit 106 transmission processing unit
107 transmission/reception control unit
201 radio communication unit
202 reception processing unit
203 transmission processing unit
204 communication unit
205 reception processing unit
206 transmission processing unit
207 measurement information processing unit
301 radio communication unit
302 reception processing unit
303 transmission data control unit
304 transmission/reception control unit
305 transmission processing unit

The invention claimed is:

1. A base station apparatus comprising:
a measuring unit that carries out a measurement of a radio signal coming from an adjacent cell while suspending at least one of radio transmission to and radio reception from a mobile station; and
a transmitting unit that transmits first information about an execution of the measurement to the mobile station.

2. The base station apparatus according to claim 1, wherein the first information includes information that can be used to specify a time at which the measurement is carried out.

3. The base station apparatus according to claim 1, wherein
the measuring unit stops at least one of the radio transmission and the radio reception intermittently during an execution of the measurement, and
the first information includes information about an intermittent stop pattern of at least one of the radio transmission and the radio reception.

4. The base station apparatus according to claim 1, wherein the first information is transmitted by using a broadcast channel that can be received by both a mobile station connecting to the own cell and a radio station not connecting to the own cell.

5. The base station apparatus according to claim 1, wherein the first information is transmitted by using a shared channel that can be received by a mobile station connecting to the own cell.

6. The base station apparatus according to claim 1, wherein the transmitting unit further transmits end information indicating an end of the measurement when the measurement is finished.

7. The base station apparatus according to claim 1, wherein the measuring unit carries out the measurement while a base station's own cell is in operation.

8. The base station apparatus according to claim 1, wherein the first information is transmitted prior to beginning the measurement in order to notify an execution of the measurement.

9. A base station apparatus comprising:
a receiving unit that receives first information from an adjacent base station that carries out a measurement of a radio signal coming from a nearby cell while suspending at least one of radio transmission to and radio reception from a mobile station, the first information being information about an execution of the measurement; and
a transmitting unit that transmits second information about an execution of the measurement to a mobile station connecting to a base station apparatus's own cell when the first information is received.

10. The base station apparatus according to claim 9, wherein
when information of the adjacent base station is included in adjacent cell information supplied from an upper-layer apparatus, the receiving unit receives the first information by using the information of the adjacent base station.

11. The base station apparatus according to claim 9, wherein the receiving unit receives a broadcast channel that is transmitted from the adjacent base station and can be received by a radio station not connecting to a cell formed by the adjacent base station, and acquires the first information included in the broadcast channel.

12. The base station apparatus according to claim 9, wherein
the receiving unit further receives end information that is transmitted from the adjacent base station in order to notify an end of the measurement, and
the transmitting unit further transmits information indicating an end of the measurement to a mobile station connecting to the own cell when the end information is received.

13. A mobile station apparatus comprising:
a receiving unit that receives first information from a first base station that is configured to carry out a measurement of a radio signal coming from a nearby cell while suspending at least one of radio transmission to and radio reception from a mobile station, the first information being information about an execution of the measurement; and
a control unit that suspends at least one of a transmitting operation and a receiving operation with the first base station based on the first information.

14. The mobile station apparatus according to claim 13, wherein the control unit suspends upward data transmission to the first base station during while the first base station suspends radio transmission.

15. The mobile station apparatus according to claim 13, wherein when the mobile station apparatus connects the nearby cell, the receiving unit receives the first information by way of a second base station that forms the nearby cell.

16. The mobile station apparatus according to claim 13, wherein the receiving operation includes reception power measurement of a radio signal transmitted from the first base station.

17. The mobile station apparatus according to claim 13, wherein the receiving operation includes reception power measurement of a pilot channel that is transmitted from the first base station and used for a hand-over execution decision of the mobile station apparatus.

18. A communication system comprising:
a first mobile station; and
a first base station that carries out a measurement of a radio signal coming from an adjacent cell while suspending at least one of radio transmission to and radio reception from the first mobile station, wherein
the first base station transmits first information about an execution of the measurement, and
the first mobile station suspends at least one of a transmitting operation of a radio signal to the first base station and a receiving operation of a radio signal from the first base station based on the first information.

19. The communication system according to claim 18, further comprising a second base station that forms the adjacent cell, wherein
the second base station receives the first information, and transmits second information about an execution of the measurement to a second mobile station connecting to the adjacent cell when the first information is received.

20. The communication system according to claim 18, wherein the first base station transmits the first information by using a broadcast channel that can be received by both the first mobile station and the second base station.

21. The communication system according to claim 20, wherein the first base station transmits the first information by using, in addition to the broadcast channel, a shared channel that can be received by the first mobile station connecting to the own cell.

22. A method for controlling a base station apparatus, the method comprising, when the base station apparatus carries out a measurement of a radio signal coming from an adjacent cell while suspending at least one of radio transmission to and radio reception from a mobile station, transmitting first information about an execution of the measurement to the mobile station.

23. A method for controlling a base station apparatus, the method comprising:
   receiving first information from an adjacent base station that carries out a measurement of a radio signal coming from a nearby cell while suspending at least one of radio transmission to and radio reception from a mobile station, the first information being information about an execution of the measurement; and
   notifying second information about an execution of the measurement to a mobile station connecting to a base station apparatus's own cell when the first information is received.

24. A method for controlling a mobile station apparatus, the method comprising:
   receiving first information from a base station that carries out a measurement of a radio signal coming from a nearby cell while suspending at least one of radio transmission to and radio reception from a mobile station, the first information being information about an execution of the measurement; and
   suspending at least one of a transmitting operation of a radio signal to the base station and a receiving operation of a radio signal from the base station based on the first information.

25. A non-transitory recording medium storing a program that causes a computer to execute control relating to a base station apparatus, wherein the control comprises, when the base station apparatus carries out a measurement of a radio signal coming from an adjacent cell while suspending at least one of radio transmission to and radio reception from a mobile station, generating first information about an execution of the measurement, the first information being transmitted to the mobile station.

26. A non-transitory recording medium storing a program that causes a computer to execute control relating to a base station apparatus, wherein the control comprises:
   acquiring first information from an adjacent base station that carries out a measurement of a radio signal coming from a nearby cell while suspending at least one of radio transmission to and radio reception from a mobile station, the first information being information about an execution of the measurement; and
   generating second information about an execution of the measurement, the second information being transmitted to a mobile station connecting to a cell formed by the base station apparatus based on the first information.

27. A non-transitory recording medium storing a program that causes a computer to execute control relating to a mobile station apparatus, wherein the control comprises:
   acquiring first information from a base station that carries out a measurement of a radio signal coming from a nearby cell while suspending at least one of radio transmission to and radio reception from a mobile station, the first information being information about an execution of the measurement; and
   suspending at least one of a transmitting operation of a radio signal to the base station and a receiving operation of a radio signal from the base station based on the first information.

* * * * *